United States Patent
Simonetti et al.

(10) Patent No.: US 10,612,421 B2
(45) Date of Patent: Apr. 7, 2020

(54) GAS TURBINE EXHAUST ASSEMBLY

(71) Applicant: Sikorsky Aircraft Corporation, Stratford, CT (US)

(72) Inventors: Joseph Lawrence Simonetti, Southbury, CT (US); Donald William Lamb, Jr., North Haven, CT (US); Shyam Neerarambam, Shelton, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 235 days.

(21) Appl. No.: 15/554,256

(22) PCT Filed: Feb. 25, 2016

(86) PCT No.: PCT/US2016/019627
§ 371 (c)(1),
(2) Date: Aug. 29, 2017

(87) PCT Pub. No.: WO2016/140866
PCT Pub. Date: Sep. 9, 2016

(65) Prior Publication Data
US 2018/0058264 A1 Mar. 1, 2018

Related U.S. Application Data

(60) Provisional application No. 62/128,209, filed on Mar. 4, 2015.

(51) Int. Cl.
*F01D 25/30* (2006.01)
*F02K 1/82* (2006.01)
(Continued)

(52) U.S. Cl.
CPC ............... *F01D 25/30* (2013.01); *F02K 1/78* (2013.01); *F02K 1/82* (2013.01); *F02K 1/825* (2013.01);
(Continued)

(58) Field of Classification Search
CPC . F01D 25/30; F02K 1/82; F02K 1/825; F02K 1/386; F02K 1/78; F02K 1/36; F05D 2220/329; F05D 2240/125
See application file for complete search history.

(56) References Cited

U.S. PATENT DOCUMENTS 2,558,816 A    7/1951   Bruynes
2,844,001 A *   7/1958   Alford .................... F01D 5/145
                                                     138/40

(Continued)

FOREIGN PATENT DOCUMENTS

EP         1191214 A2    3/2002
GB         739935 A     10/1966
GB         1045295 A    10/1966

OTHER PUBLICATIONS

International Search Report and Written Opinion; International Application No. PCT/US2016/019627; International Filing Date: Feb. 25, 2016; dated May 2, 2016; 11 Pages.
(Continued)

*Primary Examiner* — Steven M Sutherland
(74) *Attorney, Agent, or Firm* — Cantor Colburn LLP

(57) ABSTRACT

A gas turbine exhaust assembly includes an exhaust flow path configured to receive an exhaust flow from a gas turbine engine, the exhaust flow path defined by an inner hub and a radially outer wall. The gas turbine exhaust assembly also includes a plurality of vanes circumferentially spaced from each other and operatively coupled to the radially outer wall of the exhaust flow path, each of the plurality of vanes
(Continued)

extending only partially toward the inner hub and terminating at an inner end of the vanes, the inner end defining an open portion.

5 Claims, 2 Drawing Sheets

(51) Int. Cl.
    *F02K 1/78*     (2006.01)
    *F02K 1/38*     (2006.01)

(52) U.S. Cl.
    CPC ........ *F02K 1/386* (2013.01); *F05D 2220/329* (2013.01); *F05D 2240/125* (2013.01)

(56) References Cited

U.S. PATENT DOCUMENTS

| | | | | |
|---|---|---|---|---|
| 3,058,302 A * | 10/1962 | Knzyk | ...................... | F02C 7/18 60/264 |
| 3,210,934 A * | 10/1965 | Smale | ..................... | F02K 1/825 60/265 |
| 3,815,360 A | 6/1974 | Wellinitz | | |
| 4,044,555 A * | 8/1977 | McLoughlin | ........... | F02K 1/825 60/264 |
| 4,215,537 A * | 8/1980 | Hurley | ................... | B64D 33/04 239/127.3 |
| 4,295,332 A * | 10/1981 | Steyer | .................... | B64D 33/04 239/127.3 |
| 4,298,089 A * | 11/1981 | Birch | ...................... | F02K 1/386 181/213 |
| 5,517,865 A | 5/1996 | Wisler | | |
| 5,746,047 A * | 5/1998 | Steyer | .................... | B64D 33/04 239/127.3 |
| 6,502,383 B1 * | 1/2003 | Janardan | ................. | F02K 1/386 181/213 |
| 7,500,353 B2 | 3/2009 | Anderson | | |
| 8,776,946 B2 | 7/2014 | Todorovic | | |
| 2012/0144836 A1 | 6/2012 | Ress et al. | | |
| 2013/0087632 A1 | 4/2013 | Germain | | |
| 2013/0111906 A1 | 5/2013 | Bouchard et al. | | |

OTHER PUBLICATIONS

Extended European Search Report; EP 16759294; dated Sep. 20, 2018; 6 pages.

\* cited by examiner

GAS TURBINE EXHAUST ASSEMBLY

CROSS REFERENCE TO RELATED APPLICATIONS

This application is a National Stage application of PCT/US2016/019627, filed Feb. 25, 2016, which claims the benefit of U.S. Provisional Application No. 62/128,209, filed Mar. 4, 2015, both of which are incorporated by reference in their entirety herein.

BACKGROUND OF THE INVENTION

The embodiments herein generally relate to gas turbine exhaust assemblies and, more particularly, to deswirler vanes disposed in such exhaust assemblies, as well as a method of reducing swirl in exhaust assemblies.

Gas turbine exhaust ejectors typically include a high-velocity primary flow that leaves a turbine engine and transmits momentum to a surrounding medium by shear forces, thereby mixing with and directing the surrounding medium into a secondary flow. The primary and secondary flows then proceed into a secondary component having a larger diameter and referred to as a shroud. The flows are sensitive to residual swirl from the turbine exhaust and the swirl can be particularly high at operating conditions such as idle conditions, for example. Deswirl vanes are commonly used to address the swirling portion of the flow, but these vanes extend fully through the exhaust flow path.

Certain advantages and disadvantages are associated with fully extending vanes and assemblies with no vanes at all. In particular, low and high power exit swirl angles are such that engine compartment pumping is compromised because of the resultant flow field at the interface between the primary and secondary flows. No vanes allow high temperature exhaust gases to flow back into the engine compartment at low/high power conditions. Deswirl vanes are used to handle highly swirling engine flows and mitigate engine compartment backflow. However, at high engine power conditions, deswirl vanes generate losses because high power turbine exit swirl angles cause the flow to impact the deswirl vanes, thereby causing excessive exhaust system losses.

BRIEF DESCRIPTION OF THE INVENTION

According to one embodiment, a gas turbine exhaust assembly includes an exhaust flow path configured to receive an exhaust flow from a gas turbine engine, the exhaust flow path defined by an inner hub and a radially outer wall. The gas turbine exhaust assembly also includes a plurality of vanes circumferentially spaced from each other and operatively coupled to the radially outer wall of the exhaust flow path, each of the plurality of vanes extending only partially toward the inner hub and terminating at an inner end of the vanes, the inner end defining an open portion.

In addition to one or more of the features described above, or as an alternative, further embodiments may include that each of the plurality of vanes comprises a chord length that varies along a portion thereof.

In addition to one or more of the features described above, or as an alternative, further embodiments may include that each of the plurality of vanes comprises a chord length that continuously varies along an entire span thereof.

In addition to one or more of the features described above, or as an alternative, further embodiments may include that at least one of the plurality of vanes comprises a span axis that is angled relative to an axis of the gas turbine engine.

In addition to one or more of the features described above, or as an alternative, further embodiments may include that at least one of the plurality of vanes comprises a hollow airfoil.

In addition to one or more of the features described above, or as an alternative, further embodiments may include that each of the plurality of vanes comprises a leading edge and a trailing edge, the leading edge having a leading edge thickness that is greater than a trailing edge thickness.

In addition to one or more of the features described above, or as an alternative, further embodiments may include that the trailing edge comprises a tip.

In addition to one or more of the features described above, or as an alternative, further embodiments may include that the plurality of vanes extend from the radially outer wall less than halfway throughout the exhaust flow path.

In addition to one or more of the features described above, or as an alternative, further embodiments may include that the gas turbine exhaust assembly is disposed in a rotary wing aircraft.

According to another embodiment, a method of reducing swirl of an exhaust flow in a gas turbine exhaust assembly is provided. The method includes routing an exhaust flow from a gas turbine engine to an exhaust flow path defined by a radially outer wall and an inner hub. The method also includes passing the exhaust flow over a plurality of vanes circumferentially spaced from each other and operatively coupled to the radially outer wall of the exhaust flow path, each of the plurality of vanes extending only partially toward the inner hub and terminating at an inner end of the vanes. The method further includes managing thermal expansion and contraction with an open portion at the inner end of each of the vanes.

In addition to one or more of the features described above, or as an alternative, further embodiments may include varying a chord length of each of the plurality of vanes continuously over an entire span of the vanes.

In addition to one or more of the features described above, or as an alternative, further embodiments may include angling a span axis of at least one of the plurality of vanes relative to an axis of the gas turbine engine.

In addition to one or more of the features described above, or as an alternative, further embodiments may include that each of the plurality of vanes comprises a hollow airfoil.

In addition to one or more of the features described above, or as an alternative, further embodiments may include that each of the plurality of vanes comprises a leading edge and a trailing edge, the leading edge having leading edge thickness that is greater than a trailing edge thickness.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
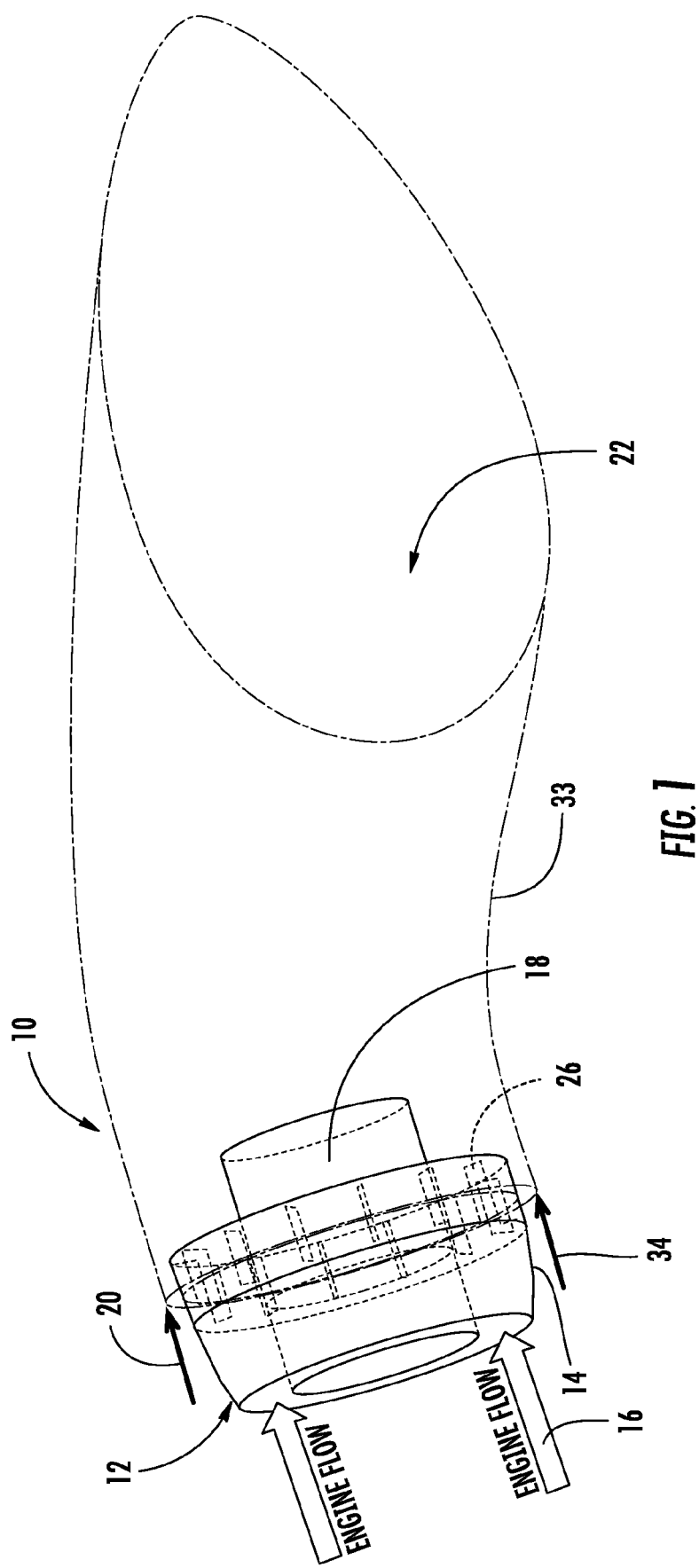
FIG. 1 is a perspective view of an exhaust assembly for a gas turbine engine.

Referring to FIG. 1, an exhaust assembly 10 for a gas turbine engine is illustrated. A gas turbine engine exhaust frame 14 is shown. In one embodiment, the gas turbine engine that the exhaust assembly 10 is operated with comprises a low pressure turbine in a rotary wing aircraft, it is to be appreciated that other sections and/or types of turbines may benefit from the embodiments of the exhaust assembly 10 described herein. The exhaust assembly 10 includes a deswirl duct tubular wall 33 that is attached to the gas turbine exhaust frame 14 to define an exhaust flow path for receiving a primary flow 16 from the gas turbine engine. The primary flow 16 is a flow of exhaust gas from the gas turbine engine. A hub 18 may be provided and surrounded by the deswirl duct tubular wall 33 to define the primary exhaust path. An exhaust ejector 20 is also used to draw a secondary flow 34 that comprises a flow of air for ventilation, cooling, or the like for combination with the primary flow 16 in an exhaust duct 22 that is downstream of the exhaust ejector 20.

During normal operation of the ejector 20, the energy from the velocity of the primary engine flow 16 encounters a surrounding, radially-outer, secondary engine compartment flow 34 of the surrounding medium by shear fluid friction forces in the exhaust duct 22, which has a larger cross-sectional area at its inlet than the cross-sectional area of the tubular wall 33 at the nozzle's outlet to allow for entry of both the primary flow 16 and the secondary flow 34.

Figure 2:
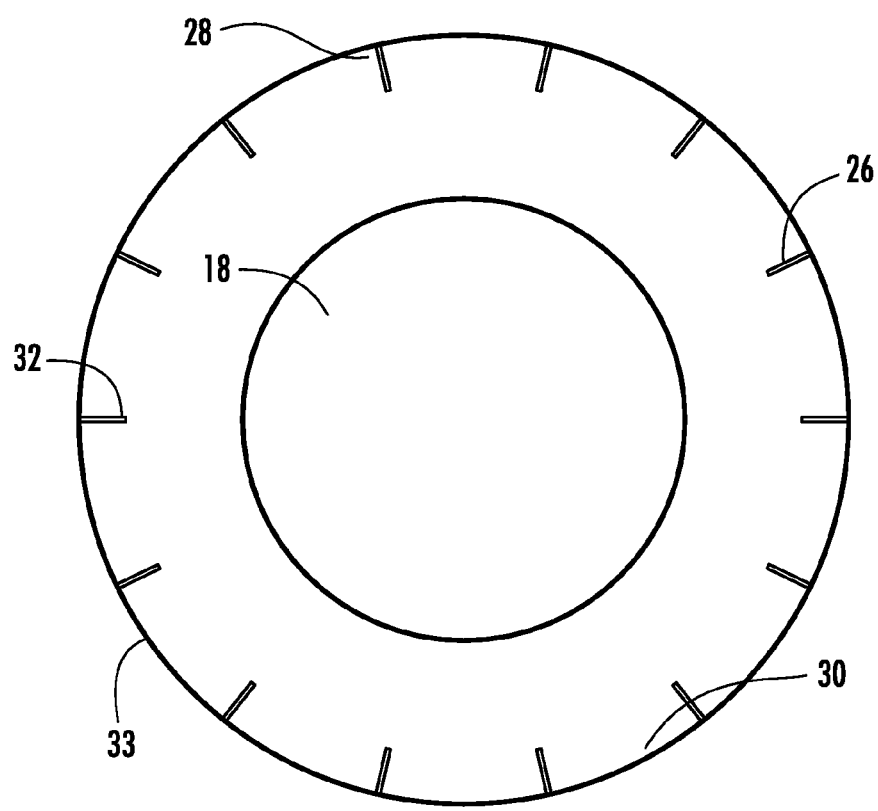
FIG. 2 is an end view of a portion of the exhaust assembly illustrating a plurality of vanes.

Referring now to FIG. 2, in conjunction with FIG. 1, ejector pumping breakdown can result from high swirl angles in the shear layer between the primary and secondary flows 16, 34. The breakdown is exacerbated by the possibility of the primary exhaust flow 16 being hub loaded; that is, the mass flow is concentrated more toward the inner radius of the gas turbine engine exhaust. To address this issue, provided is an arrangement of vanes 26 before the outlet of the tubular wall 33 to reduce the swirl angle in the area where the pumping shear forces occur between the primary and secondary flows 16, 34. To this end, in this embodiment, the deswirl duct tubular wall 33 further comprises the vanes 26 to reduce swirl in the above-described region. The vanes 26 are a plurality of circumferentially spaced vanes each having an outer end 28 connected to an inner surface 30 of the deswirl duct tubular wall 33 and an inner end 32 extending into the exhaust flow path, in a radially inward direction toward the inner hub which may contain a center body 18.

Due to the fact that the portion of the primary flow 16 that directly encounters the secondary flow 34 is at the radially outer portion of the primary flow 16, it is satisfactory to control only that portion of the primary flow 16. This is in contrast to deswirl vanes that extend fully between the inner surface 30 of the deswirl duct tubular wall 33 and the hub 18 and exhaust paths that do not have vanes at all. Certain advantages and disadvantages are associated with fully extending vanes and assemblies with no vanes. In particular, at low power exit swirl angles are such that engine compartment pumping is compromised because of the resultant flow field at the interface between the primary and secondary flows 16, 34. No vanes allow high temperature engine exhaust to flow back into the engine compartment at low power. At high power, full span deswirl vanes generate greater losses because high power turbine exit swirl angles cause the flow to impact the deswirl vanes, thereby causing excessive exhaust system losses.

As shown best in FIG. 2, the vanes 26 only extend partially into the exhaust flow path, rather than extending completely to the hub 18. The degree to which the vanes 26 extend will vary depending upon the particular application. In one embodiment, the vanes 26 extend less than halfway into the exhaust flow path. Therefore, the vanes 26 may be referred to as a part span vane arrangement and minimizes losses by limiting the vane span to the flow area required to maintain compartment pumping at low power. Because the vane span does not cover the entire exhaust flow path, losses are minimized at high power as well.

Figure 3:
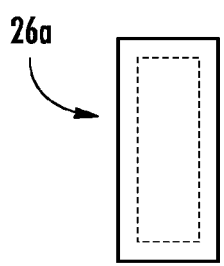
FIG. 3 is a side view of a hollow vane.
Figure 4:
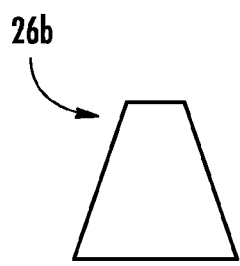
FIG. 4 is an end view of a vane having a chord length that varies along a portion of the vane.
Figure 5:
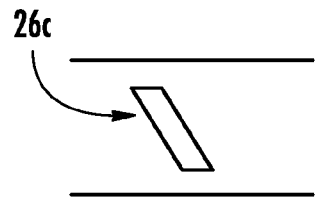
FIG. 5 is a top view of a vane that includes a varied vane span angle.
Figure 6:
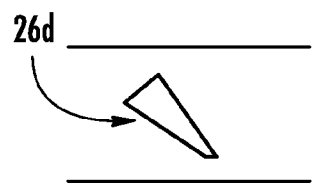
FIG. 6 is a top view of a vane having a leading edge thickness that is greater than a trailing edge thickness.

In one embodiment, at least one of the vanes 26 includes an open portion at the inner end 32 to allow for thermal expansion and/or contraction while limiting thermally induced stresses. Additional features of the vanes 26 relate to their geometries. In particular, the vanes 26 may comprise an airfoil geometry with leading edge aerodynamic shaping to minimize separation at high swirl angles. In one embodiment, at least one of the vanes 26 is a hollow airfoil that reduces the weight of the vane such as shown at 26a in FIG. 3. One or more of the vanes 26 may comprise a chord length that varies along a portion, or an entirety, of the vane such as shown at 26b in FIG. 4. Additionally, one or more of the vanes 26 may comprise a varied vane span angle such as shown at 26c in FIG. 5. This refers to a vane span axis that is disposed at some angle to the axis of the engine (e.g., normal direction of the outer deswirl duct wall). Such variance essentially varies the angle at which the chord length is measured and provides for alternate shapes. Furthermore, the vanes 26 may be aerodynamically optimized by having a radius or appropriate airfoil leading edge and may be cambered or non-cambered based on the design condition swirl angle. The trailing edge thickness and shape may come to a point or have some degree of radius shaping and/or camber such as shown at 26d in FIG. 6. This shape may change along the span of the vane to accommodate a varying radial swirl profile.

As noted above, the type of gas turbine engine that the exhaust assembly works in conjunction with may vary, but in one embodiment the turbine is a "hub loaded" low pressure turbine. The term "hub loaded" refers to non-uniform radially distributed mass flow across the core flow annulus with the bias of higher flow being at the hub (i.e., inner radius of the annulus).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of reducing swirl of an exhaust flow in a gas turbine exhaust assembly, the method comprising:

routing an exhaust flow from a gas turbine engine to an exhaust frame arranged at inlet of a deswirl duct tubular wall defined by an outer wall having an inner surface and an inner hub disposed radially inwardly of the outer wall;

passing the exhaust flow over a plurality of vanes circumferentially spaced from each other and operatively coupled to the inner surface of the outer wall of the exhaust frame, each of the plurality of vanes extending only partially toward the inner hub and terminating at a cantilevered end; and managing thermal expansion and contraction with an open portion at the cantilevered end of each of the vanes.

2. The method of claim 1, further comprising varying a chord length of each of the plurality of vanes continuously over an entire span of the vanes.

3. The method of claim 1, further comprising angling a span axis of at least one of the plurality of vanes relative to an axis of the gas turbine exhaust assembly.

4. The method of claim 1, wherein each of the plurality of vanes comprises a hollow airfoil.

5. The method of claim 1, wherein each of the plurality of vanes comprises a leading edge and a trailing edge, the leading edge having leading edge thickness that is greater than a trailing edge thickness.

\* \* \* \* \*